US011603139B2

(12) United States Patent
Okamura et al.

(10) Patent No.: US 11,603,139 B2
(45) Date of Patent: Mar. 14, 2023

(54) VEHICLE FRONT STRUCTURE

(71) Applicant: MAZDA MOTOR CORPORATION, Hiroshima (JP)

(72) Inventors: Kazumi Okamura, Hiroshima (JP); Motoi Aoki, Hiroshima (JP); Makoto Shinhama, Hiroshima (JP); Minoru Shitamori, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 364 days.

(21) Appl. No.: 17/057,493

(22) PCT Filed: May 29, 2019

(86) PCT No.: PCT/JP2019/021275
§ 371 (c)(1),
(2) Date: Nov. 20, 2020

(87) PCT Pub. No.: WO2019/230794
PCT Pub. Date: Dec. 5, 2019

(65) Prior Publication Data
US 2021/0371015 A1 Dec. 2, 2021

(30) Foreign Application Priority Data
May 30, 2018 (JP) .............................. JP2018-103201

(51) Int. Cl.
*B62D 25/10* (2006.01)
*B62D 25/12* (2006.01)
(Continued)

(52) U.S. Cl.
CPC .......... *B62D 25/12* (2013.01); *B60R 13/0838* (2013.01); *B62D 25/10* (2013.01); *E05D 13/006* (2013.01); *F02B 77/11* (2013.01)

(58) Field of Classification Search
CPC ...... B62D 25/12; B62D 25/10; B62D 25/105; B60R 13/08; B60R 13/0838; B60R 13/0876; F02B 77/11; E05D 13/006
See application file for complete search history.

(56) References Cited

U.S. PATENT DOCUMENTS 10,266,128 B2 * 4/2019 Hoshino ................ B60K 11/06
10,669,918 B2 * 6/2020 Hoshino ................... F02F 7/00
(Continued)

FOREIGN PATENT DOCUMENTS

JP 2017-177966 A 10/2017

OTHER PUBLICATIONS

An Office Action mailed by China National Intellectual Property Administration dated Oct. 29, 2021, which corresponds to Chinese Patent Application No. 201980035097.0 and is related to U.S. Appl. No. 17/057,493.
(Continued)

*Primary Examiner* — Gregory A Blankenship
(74) *Attorney, Agent, or Firm* — Studebaker & Brackett PC

(57) ABSTRACT

Provided is a vehicle front structure capable of, without breaking a lid provided at a thermal insulating cover, reliably closing a bonnet and the lid even if an attempt is made to close the bonnet prior to closing the lid. In the present invention, a thermal insulating cover 10 including a lid 30 that covers the upper side of an engine in an openable and closable manner is provided below a bonnet 1 that covers the upper side of an engine room in an openable and closable manner; the lid 30 is provided with, in the vehicle front-rear direction, a hinge fulcrum 36 on the same rear end side as a hinge fulcrum 4 of the bonnet 1 and is openable and closable independently of the bonnet 1; and the lid 30 includes locking means 40 that is locked to the bonnet 1
(Continued)

when the lid 30 is open and is released from the locking in conjunction with a closing operation of the bonnet 1.

11 Claims, 7 Drawing Sheets

(51) Int. Cl.
  *F02B 77/11*   (2006.01)
  *B60R 13/08*   (2006.01)
  *E05D 13/00*   (2006.01)

(56) References Cited

U.S. PATENT DOCUMENTS

| | | | |
|---|---|---|---|
| 2002/0033286 A1* | 3/2002 | Brogly | E05D 3/18 |
| | | | 180/69.2 |
| 2005/0264024 A1 | 12/2005 | Mulder et al. | |
| 2009/0179460 A1* | 7/2009 | Peterson | B60R 13/0861 |
| | | | 296/193.11 |
| 2018/0244216 A1* | 8/2018 | Hoshino | F02B 77/11 |
| 2018/0291804 A1* | 10/2018 | Nola | F02B 77/11 |
| 2020/0047470 A1* | 2/2020 | Asai | B32B 5/18 |
| 2020/0207062 A1* | 7/2020 | Yamane | B32B 15/04 |
| 2021/0214014 A1* | 7/2021 | Okamura | B62D 25/12 |
| 2021/0371015 A1* | 12/2021 | Okamura | F02B 77/11 |
| 2022/0009419 A1* | 1/2022 | Kim | B62D 25/12 |

OTHER PUBLICATIONS

International Search Report issued in PCT/JP2019/021275; dated Jul. 30, 2019.
International Preliminary Report on Patentability and Written Opinion issued in PCT/JP2019/021275 ; dated Dec. 1, 2020.

\* cited by examiner

VEHICLE FRONT STRUCTURE

TECHNICAL FIELD

The present invention relates to a vehicle front structure in which a thermal insulating cover including a lid that covers the upper side of an engine in an openable and closable manner is provided below a bonnet that covers the upper side of an engine room in an openable and closable manner.

BACKGROUND ART

A structure has been known in which, for the purpose of, for example, warming-up advancement at the time of the next operation of an engine, a thermal insulating cover covers the engine from the top face to the side portion for retaining heat of the engine (see Patent Literature 1).

The thermal insulating cover (30) in Patent Literature 1 includes an upper thermal insulating cover (33) that covers the upper side of the engine and serves as a rotatable lid pivotably attached to the rear side relative to the engine and the front side relative to a pivotally attached portion to a vehicle body of a bonnet.

Furthermore, as in Patent Literature 1, a mechanism has also been known in which a thermal insulating cover including a lid that covers the upper side of an engine in an openable and closable manner includes, for example, locking means that locks the lid to, for example, a bonnet for keeping the lid open during, for example, replacement or maintenance of engine components covered by the thermal insulating cover.

However, due to, for example, a difference in pivot attachment positions of the bonnet and the lid of the thermal insulating cover to the vehicle body, a relative deviation occurs in the rotational displacements at the time of the closing operation. Thus, in a state where the bonnet and the lid are locked to each other by the locking means, if an attempt is made to close the bonnet in a state where the lid is open due to, for example, omission of closing the lid, there is a concern that the lid breaks by, for example, being excessively pulled by the bonnet via the locking means during the closing operation. Patent Literature 1 described above does not mention measures against such a concern.

CITATION LIST

Patent Literature

Patent Literature 1: Japanese Patent Laid-Open No. 2017-177966

SUMMARY OF INVENTION

Technical Problem

The present invention has been made in view of such a problem and has an object to provide a vehicle front structure capable of, without breaking a lid provided at a thermal insulating cover, reliably closing a bonnet and the lid even if an attempt is made to close the bonnet prior to closing the lid.

Solution to Problem

To achieve the object, the present invention is a vehicle front structure characterized by including an engine room in which an engine is disposed; a bonnet covering an upper side of the engine room in an openable and closable manner; a bonnet hinge fulcrum provided at a predetermined end portion of the bonnet and rotatably supporting the bonnet; a thermal insulating cover, on a lower side of the bonnet, comprising a lid covering an upper side of the engine in an openable and closable manner in the engine room; a lid hinge fulcrum provided at a predetermined end portion of the lid of the thermal insulating cover; a locked member provided at the bonnet to lock the lid of the thermal insulating cover; and a locking mechanism provided at the lid of the thermal insulating cover to, when the lid is open, lock the lid to the locked member of the bonnet in an open state, wherein the lid hinge fulcrum is, in a vehicle front-rear direction, provided at the predetermined end portion of the lid of the thermal insulating cover on the same side as the predetermined end portion of the bonnet at which the bonnet hinge fulcrum is provided; the lid of the thermal insulating cover is openable and closable independently of the bonnet when the locking mechanism of the lid is not locked to the locked member of the bonnet; and the locked member of the bonnet and the locking mechanism of the lid are configured such that, from open states of the bonnet and the lid in which the locking mechanism of the lid is locked to the locked member of the bonnet, when a closing operation of the bonnet in which the bonnet rotates around the bonnet hinge fulcrum is performed, in conjunction with the closing operation, locking of the locking mechanism of the lid to the locked member of the bonnet is released.

According to the present invention configured in this way, in conjunction with the closing operation of the bonnet, locking of the locking mechanism of the lid to the locked member of the bonnet is released, and thus, while breakage of the lid of the thermal insulating cover is prevented, the lid can be reliably closed together with the bonnet.

Furthermore, in the present invention, preferably, the locked member of the bonnet and the locking mechanism of the lid are configured such that, in conjunction with the closing operation of the bonnet, locking of the locking mechanism of the lid to the locked member of the bonnet is released at around an intermediate opening in an opening of the bonnet from a fully-open state to a fully-closed state.

According to the present invention configured in this way, at the time of the closing operation of the bonnet, after the bonnet is inclined until the opening decreases to some extent or before the bonnet is inclined at an opening just before the fully-closed state is reached, locking of the locking means is released, and thereby a large load can be effectively prevented from acting on the lid.

Furthermore, in the present invention, preferably, the bonnet and the lid are in a positional relationship in which a bridge distance between the lid and the bonnet between which the locking mechanism of the lid locked to the locked member of the bonnet forms a bridge becomes larger when the locking mechanism of the lid is released from the locked member of the bonnet than when the locking mechanism of the lid is locked to the locked member of the bonnet, and the locked member of the bonnet and the locking mechanism of the lid are configured such that, during the closing operation of the bonnet, the lid performs a closing operation by using the lid hinge fulcrum as a fulcrum, increasing the bridge distance, and the locking mechanism of the lid is thereby pulled in a direction of a tip side of the bonnet (a direction opposite to an end side provided with the bonnet hinge fulcrum), releasing locking of the locking mechanism of the lid to the locked member of the bonnet.

According to the present invention configured in this way, the bridge distance between both members of the bonnet and the lid which the locking mechanism forms a bridge becomes larger when the locking mechanism is released than when the locking mechanism is locked, and, in association with this, by using the fact that the locking mechanism is pulled in the direction of the tip side of the bonnet by the lid, locking of the locking mechanism with respect to the bonnet can be effectively automatically released at the time of the closing operation of the bonnet.

Furthermore, in the present invention, preferably, the locking mechanism provided at the lid includes a locking member having a predetermined length to lock to the locked member of the bonnet, and an extending member having flexibility, extending from at least a tip portion of the lid, and having another end mounted on the locking member, a total of lengths of the locking member and the extending member is a length corresponding to at least the bridge distance, and an open portion open in the direction of the tip side of the bonnet is formed at the locked member of the bonnet.

According to the present invention configured in this way, by the simple structure of using the relative positional change of the locking mechanism with respect to the open portion of the locked member, holding of the lid can be automatically released.

Furthermore, in the present invention, preferably, the locking member of the locking mechanism includes a locking portion configured to lock to the locked member of the bonnet, and a space portion configured to lock the locking portion of the locking member is formed at the locked member of the bonnet.

According to the present invention configured in this way, by the simple structure of using the relative positional change of the locking mechanism with respect to the open portion of the locked member, holding of the lid can be automatically released.

Furthermore, in the present invention, preferably, the lid, in conjunction with the closing operation of the bonnet, due to a self-weight of the lid, performs a closing operation in which the lid rotates around the lid hinge fulcrum from an open state in which the locking mechanism of the lid is locked to the locked member of the bonnet, and the bonnet and the lid are configured such that, as the closing operations of the bonnet and the lid proceed, the locking mechanism of the lid which connects the locked member of the bonnet and the tip portion of the lid and extends in a linear shape including the bridge distance is displaced so as to be inclined toward the vehicle front-rear direction and is pulled in the direction of the tip side of the bonnet by the closing operation due to the self-weight of the lid, thereby releasing the locking member of the locking mechanism through the open portion formed at the locked member of the bonnet.

According to the present invention configured in this way, by the simple structure of using the relative positional change of the locking mechanism with respect to the open portion of the locked member, holding of the lid can be automatically released.

Furthermore, in the present invention, preferably, a predetermined end portion of the bonnet hinge fulcrum is a rear end portion of the bonnet, a predetermined end portion of the lid hinge fulcrum is a rear end portion of the lid, and, in a vehicle side view, the lid hinge fulcrum is provided at a position shifted toward a vehicle front side with respect to the bonnet hinge fulcrum.

Advantageous Effect of Invention

The present invention can, without breaking the lid provided at the thermal insulating cover, reliably close the bonnet and the lid even if an attempt is made to close the bonnet prior to closing the lid.

DESCRIPTION OF EMBODIMENTS

Figure 1:
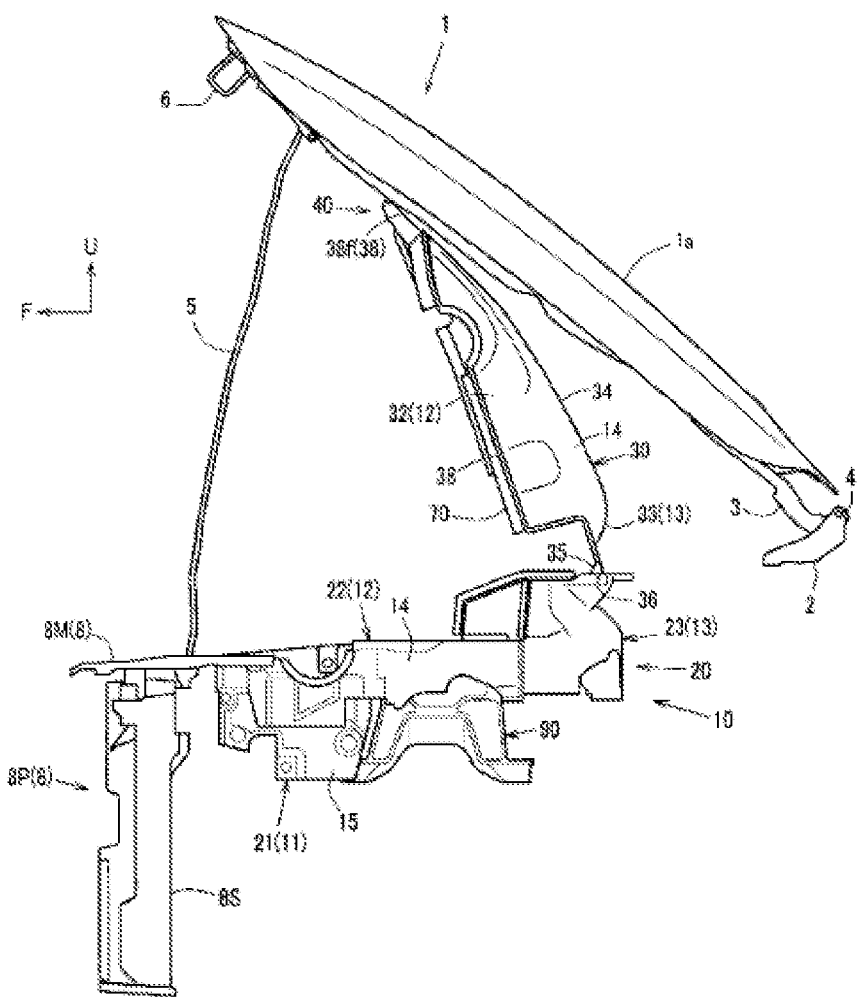
FIG. 1 is a left side view showing a main portion of a vehicle front structure according to an embodiment of the present invention in a fully-open opening state of each of a bonnet and a lid.

Hereinafter, an embodiment of the present invention will be described in detail based on the drawings.

In the drawings, arrow F indicates the vehicle front side; arrow R, the vehicle right side; arrow L, the vehicle left side; arrow U, the vehicle upper side.

First, a basic structure of a vehicle front structure of the present embodiment will be explained mainly with reference to FIGS. 1 and 2. FIG. 1 is a left side view showing a main portion of the vehicle front structure according to the embodiment of the present invention in a fully-open opening state of each of a bonnet and a lid, and FIG. 2 is a front view showing the main portion of the vehicle front structure according to the embodiment of the present invention in the fully-open opening state of each of the bonnet and the lid.

Above an engine room of a front portion of the vehicle, a bonnet 1 (also referred to as a "hood") that covers the engine room in an openable and closable manner is disposed.

Figure 2:
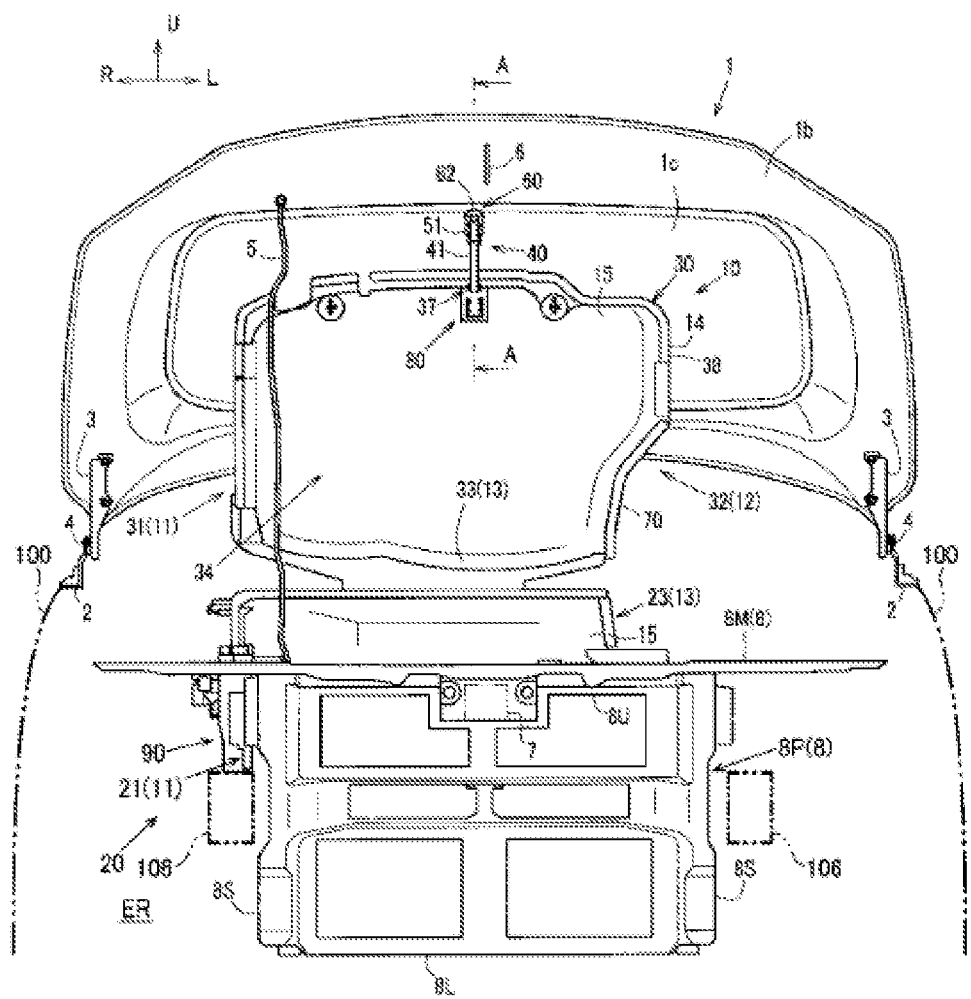
FIG. 2 is a front view showing the main portion of the vehicle front structure according to the embodiment of the present invention in the fully-open opening state of each of the bonnet and the lid.
Figure 5:
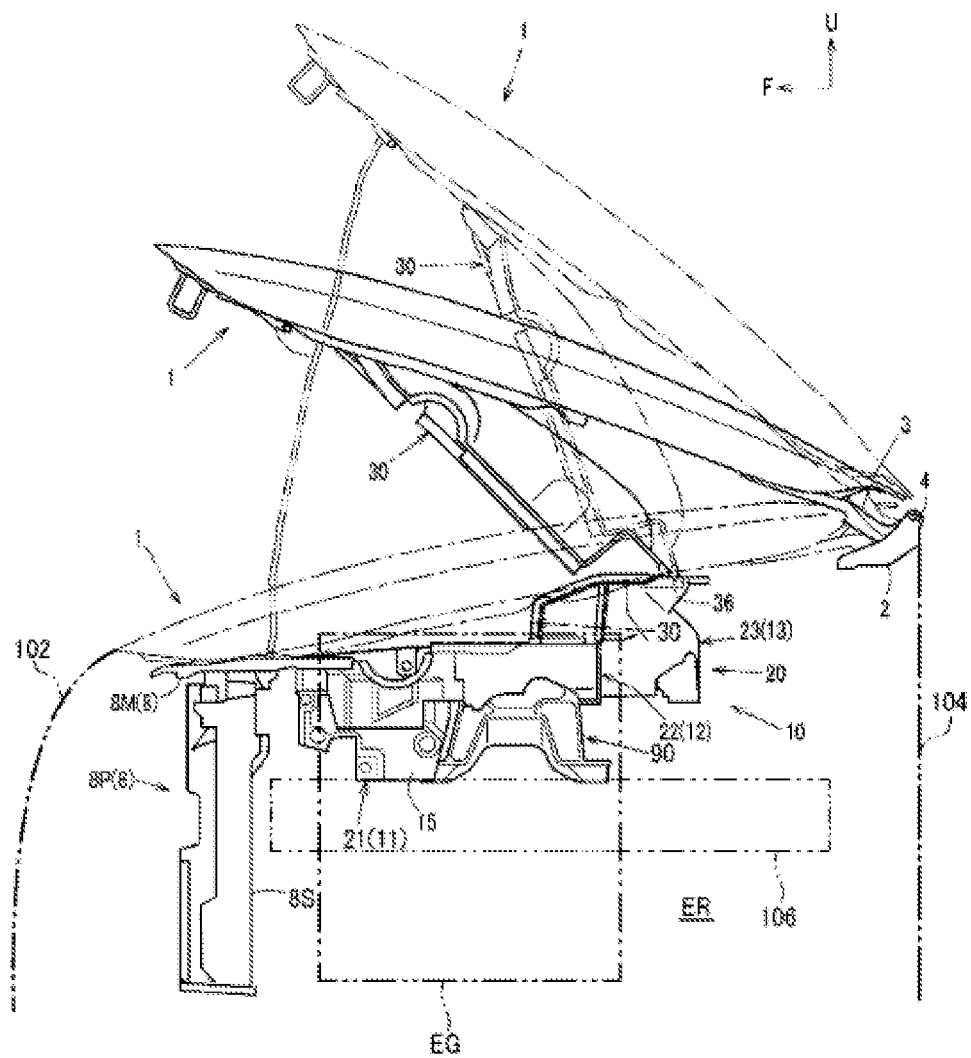
FIG. 5 is a left side view similar to FIG. 1 which shows fully-open opening, locking release opening, and fully-closed opening states of each of the bonnet and the lid.

An engine room ER is a space surrounded by, mainly, front fender panels 100 provided on the left and right sides of the vehicle, a front bumper face 102 provided at a front end portion of the vehicle, and a dash panel 104 provided on the passenger compartment side of the vehicle, as indicated by a virtual line (see FIGS. 2 and 5). The upper side of this engine room ER is covered by the bonnet 1 in an openable and closable manner.

In this engine room ER, an engine EG is provided.

Furthermore, in the engine room ER, a front side frame 106 extending in the vehicle front-rear direction is disposed on each of the left and right sides of the engine EG.

The bonnet 1 includes an outer panel 1a (see FIG. 1) and an inner panel 1b (see FIG. 2) located therebelow. In the bonnet 1, so that an internal space 1s (see FIG. 4) is appropriately formed between these panels 1a and 1b, an end portion of the outer panel 1a of a metal plate is folded so as to interpose an end portion of the inner panel 1b of a metal plate, and the two are configured as a unit. Furthermore, a bottom face of the inner panel 1b (a face on the side facing to the engine) includes an insulator 1c (see FIG. 2) at a center portion thereof.

This bonnet 1 is, on both left and right sides of a rear end portion thereof, rotatably supported by hinge brackets 2 for the bonnet 1 which are fixed to the body (vehicle body) side, via hinges 3. Thereby, the bonnet 1 is configured so as to be openable and closable by using, as a fulcrum, a pair of left and right support portions 4 on the body side (hereinafter referred to as the "bonnet pivotally attached portion 4") which rotatably supports the bonnet 1.

Furthermore, the vehicle front structure of the present embodiment includes a bonnet stay 5 (also referred to as a "bonnet supporting rod") that holds the bonnet 1 in an open state. This bonnet stay 5 is formed by, for example, bending a round bar member made of steel.

The bonnet 1 is lockable to a latch mechanism 7 (see FIG. 2) mounted on a center portion of an upper end of a shroud panel 8P in the vehicle width direction via a striker 6 provided at a bottom face of a front end portion of the bonnet 1.

The lower side of the bonnet 1 includes a thermal insulating cover 10 as a thermal insulating structure of the engine which covers the engine (illustrated omitted) from an upper portion thereof to the side. This thermal insulating cover 10 is formed by an upper wall 34, a front wall (8), a rear wall 13, and side walls 11 and 12 on the left and right sides.

The thermal insulating cover 10 includes a cover body 20, and a lid 30 that is attached to the cover body 20 in an openable and closable manner and covers the engine.

The cover body 20 includes a cover body right-side wall 21 and a cover body left-side wall 22 (see FIG. 1) which cover the sides of the engine on the respective vehicle left and right sides, a cover body rear wall 23 that covers the rear side of the engine, and a shroud 8 as the front wall.

Here, as shown in FIG. 1, the above-described shroud 8 is formed by the shroud panel 8P covering a radiator as a heat exchanger and a capacitor, and a shroud upper member 8M located at an upper portion of the shroud panel 8P. As shown in FIG. 2, the shroud panel 8P is formed by integrating an upper side portion 8U, a lower side portion 8L, and left and right side portions 8S connecting these upper and lower side portions 8U and 8L in the up-down direction, in a substantially square frame shape. At a vehicle-width-direction center portion of a top face of the upper side portion 8U, the latch mechanism 7 is provided which locks the striker 6 provided at the bottom face of the front end portion of the bonnet 1 (see FIG. 2).

The shroud upper member 8M extends in the vehicle width direction at at least an upper portion of the shroud panel 8P and has both sides in the vehicle width direction which extend rearward on the vehicle-width-direction outer side and are connected to hinge pillars via aprons.

Furthermore, as shown in FIGS. 1 and 2, the cover body right-side wall 21 is not disposed so as to cover the entire right side of the engine (the side of the engine on the vehicle right side) and is disposed so as to cover only a region corresponding to substantially a front half of the right side of the engine in the vehicle front-rear direction. At a region corresponding to substantially a rear half of the right side of the engine, an engine mount bracket 90 in a raised wall shape is disposed.

The cover body 20 of the thermal insulating cover 10 and the engine mount bracket 90 are, for example, mounted on and supported by bodies of the pair of left and right front side frames 106 (see FIG. 2) by means of a bolt or the like which is disposed on the left and right sides of the engine and each forms a closed cross-section extending in the vehicle front-rear direction.

As shown in FIGS. 1 and 2, the lid 30 includes the upper wall 34 forming a top face, a lid right-side wall 31 (see FIG. 2) and a lid left-side wall 32 which cover side upper portions of the engine on the respective vehicle left and right sides, and a lid rear wall 33 that covers a rear upper portion of the engine.

The lid right-side wall 31, the lid left-side wall 32, and the lid rear wall 33 extend downward in a skirt shape from a right edge, left edge, and rear edge of the upper wall 34, respectively. The upper wall 34 is formed so that a top face thereof is, corresponding to the shape of the bonnet 1, moderately inclined so as to become gradually lower from a rear portion thereof toward the front side (see FIG. 1).

Figure 3:
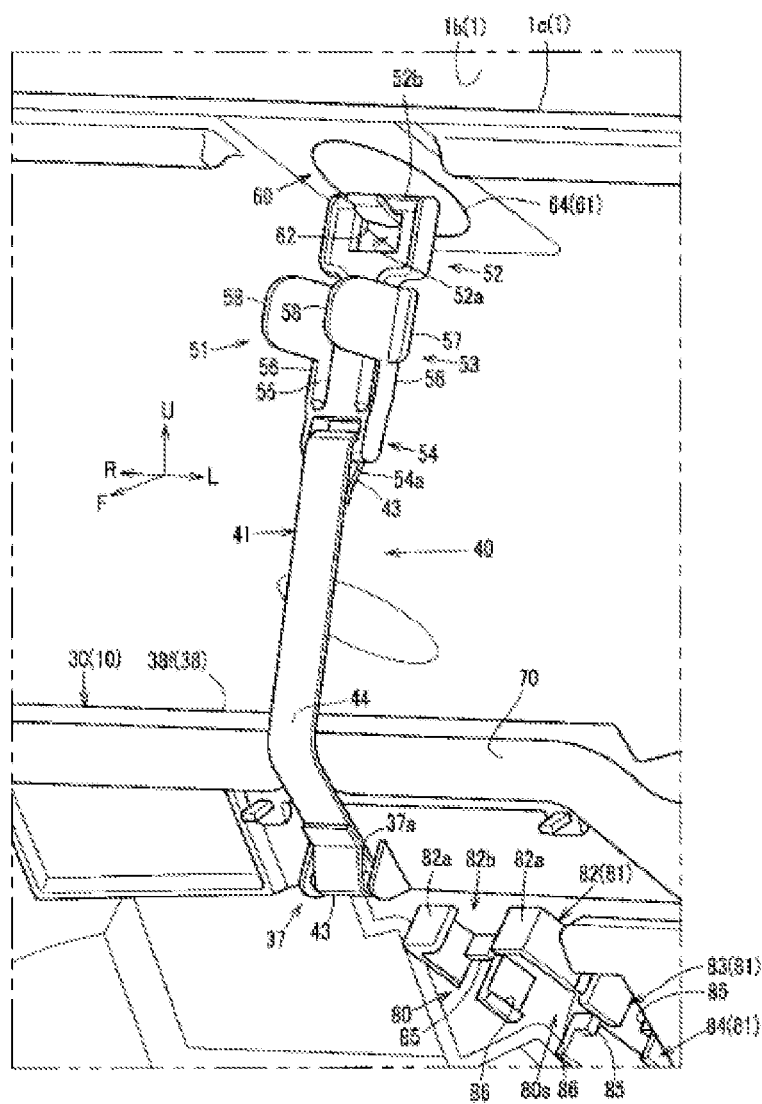
FIG. 3 is an enlarged view of the main portion when a locking portion formed by locking means of the lid and a locked portion of the bonnet according to the embodiment of the present invention is viewed diagonally from the left front side.

A lower end peripheral edge of the lid 30, namely, a front lower edge of the upper wall 34 and each of lower edges of the lid rear wall 33, the lid right-side wall 31, and the lid left-side wall 32 are formed integrally with a flange 38 extending outward in a plan view from these lower edges (see FIG. 3).

Here, the right-side wall 11, the left-side wall 12, and the rear wall 13 are all formed in a raised wall shape by the lid right-side wall 31 and the cover body right-side wall 21 as shown in FIGS. 1 and 2, the lid left-side wall 32 and the cover body left-side wall 22 as shown in FIG. 1, and the lid rear wall 33 and the cover body rear wall 23 as shown in FIGS. 1 and 2, respectively.

The above-described cover body 20 and lid 30 both include an outer cover member 14 made of synthetic resin, and a thermal insulating member 15 integrally disposed at an inner face of this outer cover member 14.

The thermal insulating member 15 is formed of, for example, a glass wool material or a urethane material so as to have a sound absorbing effect in addition to a thermal insulating effect and mounted by a clip or the like on an appropriate portion of the inner face of the outer cover member 14 at which the thermal insulating member 15 is disposed.

The lid 30 is rotatably supported by portions on both left and right sides which are spaced apart from each other in the vehicle width direction from an upper end of the cover body rear wall 23, via a pair of left and right hinges 35 (see FIG. 1).

Thereby, the lid 30 is pivotably attached by using, as a fulcrum, a pair of left and right support portions 36 (hereinafter referred to as the "lid pivotally attached portion 36") at the cover body rear wall 23 which rotatably supports the lid 30.

The lid pivotally attached portion 36 is provided on the rear end side of the thermal insulating cover 10 which is the same side as that of the bonnet pivotally attached portion 4 located at a rear end of the bonnet 1, and provided at a position shifted toward the vehicle front side and slightly the lower side with respect to the bonnet pivotally attached portion 4 in a vehicle side view.

As shown in FIGS. 1 and 2, on a peripheral edge of the lid 30, namely, an edge portion where the lid 30, when closed, faces to the cover body 20 and the engine mount bracket 90, such as a bottom face of the flange 38 provided at a lower edge portion of the lid 30, a tongue-shaped seal member 70 formed of a rubber member is mounted.

Thereby, the lid 30 is, when closed, elastically supported by the cover body 20 and the engine mount bracket 90 via the seal member 70.

As shown in FIGS. 1 and 2, the above-described lid 30 includes locking means 40 for holding the lid 30 in an open state. The locking means 40 is locked to a locked portion (locked member) 62 (see FIG. 2) on the bonnet 1 side held by the bonnet stay 5 in an open state, and thereby this locking means 40 holds the lid 30 in an open state.

Hereinafter, with respect to the above-described basic structure, the vehicle front structure of the present embodiment in which the locking means 40, the locked portion 62, and the like are provided will be explained with reference to FIGS. 1 to 4.

Figure 4:
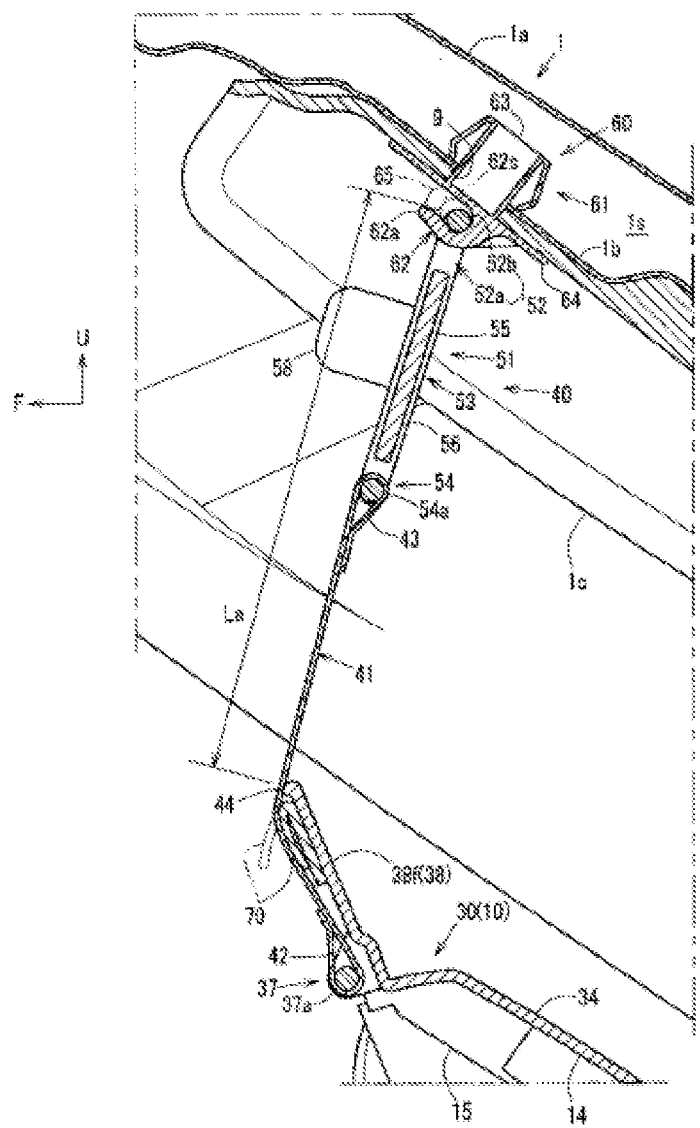
FIG. 4 is a cross-sectional view taken along line A-A in FIG. 2.

First, as shown in FIGS. 2 to 4, the locking means 40 is a mechanism that forms a bridge between the bonnet 1 and the lid 30, namely, a mechanism for connecting and joining the lid 30 to the bonnet 1 in an open state via this locking means 40 as described later. This locking means 40 is formed by a belt-shaped band 41 as an elongated member having flexibility for extending from the lid 30 side, and a locking member 51 that locks to the bonnet 1 side.

The elongated member, not limited to the belt-shaped band 41, may be, for example, a string or a chain, and is not particularly limited as long as it has a strength or a length which is capable of joining the bonnet 1 and the lid 30.

Next, as shown in FIGS. 3 and 4, the locking member 51 is formed in a rectangular plate shape in the vehicle width direction in a front view and has a predetermined longitudinal direction. As described later, this locking member 51 is configured so as to extend on the same straight line as the band 41 extended in a linear shape by the self-weight of the lid 30. In this state of extending on the same straight line, the longitudinal direction of the locking member 51 coincides with that of the band 41. This locking member 51 includes a frame-shaped locking frame portion 52 that locks to the locked portion 62 provided on the bonnet 1 side, a grip portion 53, and a band mounting frame portion 54 mounted on the tip side (one end side in the length direction) of the band 41. The locking frame portion 52, the grip portion 53, and the band mounting frame portion 54 are integrally formed by resin molding in this order along the longitudinal direction. Hereinafter, explanation will be made in which, in the longitudinal direction of the locking member 51, the locking frame portion 52 side is used as the front side of the locking member 51 and the band mounting frame portion 54 side is used as the rear side of the locking member 51.

The locking frame portion 52 is formed in a frame shape (closed ring shape) having a through hole 52a that passes through a center portion thereof in a front view in the thickness direction and allows insertion of the locked portion 62 on the bonnet 1 side. The front end side of the locking frame portion 52 includes a locking portion 52b extending in a columnar shape in the vehicle width direction so as to be lockable to the locked portion 62.

The band mounting frame portion 54 has a center portion in a front view which passes therethrough in the thickness direction, and the rear end side thereof includes a columnar-shaped axis portion 54a extending in the vehicle width direction. The locking member 51 is mounted on a tip portion of the band 41 by inserting this axis portion 54a through a ring-shaped portion 43 on the tip side of the band 41.

The grip portion 53 includes a connecting rod 55 extending in a linear shape along the longitudinal direction at a center position of the locking member 51 in the vehicle width direction and integrally connecting the locking frame portion 52 and the band mounting frame portion 54, and elastic rods 56 disposed parallel to each other and spaced apart from each other on both sides in the vehicle width direction with respect to this connecting rod 55 and serving as a pair of left and right levers extending in a cantilever shape from the band mounting frame portion 54 side up to a position before the locking frame portion 52.

The pair of elastic rods 56 each has a storage locking claw 57 formed at a tip portion thereof (front portion) in the projection direction toward the front side and projecting toward the vehicle-width-direction outer side so as to be lockable to the side of a storage 80 described later, and each has a pinching piece 58 formed thereon and projecting from one face of the locking member 51 (specifically, a face facing toward the substantially vehicle front side in a state where the locking member 51 is locked to the locked portion 62 [see FIG. 3]).

In the pair of elastic rods 56, the front portion (the tip portion in the projection direction) is formed so as to be capable of bending deformation (elastic deformation) by a user pinching the pair of pinching pieces 58 with his or her fingers so as to be biased to the vehicle-width-direction inner side (the side adjacent to the connecting rod 55).

Here, as shown in FIGS. 3 and 4, a clip 60 mounted on the bonnet 1 includes, as a part of thereof, the locked portion 62 provided on the bonnet 1 side for locking the locking member 51.

As shown in FIG. 4, the clip 60 includes a bonnet mounting portion 61 mounted on a clip mounting hole 9 formed at the bonnet 1, and the locked portion 62, and the bonnet mounting portion 61 and the locked portion 62 are integrally formed by resin molding. The clip mounting hole 9 is a through hole formed to pass through the insulator 1c and the inner panel 1b at a front portion of the bonnet 1 and a vehicle-width-direction center position thereof (clip mounting position).

The bonnet mounting portion 61 is formed by integrating an insertion portion 63 formed in an arrow shape facing in the insertion direction into the clip mounting hole 9 and insertable into the clip mounting hole 9, and a protrusion portion 64 protruding in a flange shape (suction cup shape) from a base end (on the locked portion 62 side) of this insertion portion 63. The bonnet mounting portion 61 is, in a state where the insertion portion 63 thereof is inserted into the clip mounting hole 9, mounted on the bonnet 1 so as to interpose the insulator 1c and the inner panel 1b between the insertion portion 63 and the protrusion portion 64.

The locked portion 62 is formed in a hook shape in which a tip thereof projects toward the front end side of the bonnet 1 from the insulator 1c in a state where the clip 60 is mounted on the clip mounting hole 9.

Next, a configuration of this locked portion 62 will be explained with reference to FIG. 4. Here, although FIG. 4 shows a state where the bonnet 1 is "fully open," hereinafter, for convenience of explanation for the positional relationship and the direction, explanation will be made based on a posture of the locked portion 62 when the bonnet 1 is "fully closed." Namely, the posture of the locked portion 62 when the bonnet 1 is "fully closed" is a posture of the bonnet 1 indicated by a one-dot chain line in FIG. 5 described later, and hereinafter a configuration of "the vehicle up-down direction and vehicle front-rear direction" of the locked portion 62 in this posture will be explained. Note that in the present embodiment, as described later, an example is shown in which the fully-open opening of the bonnet 1 is about 47 degrees, and thus the posture of the locked portion 62 when the bonnet 1 is "fully closed" can be seen by rotating FIG.

4 approximately by this angle counterclockwise. First, in the locked portion 62, the base side in the projection direction extends in the lower direction spaced apart from the insulator 1c, and the tip side relative to the base side gradually extends forward toward the tip (the tip side of the bonnet 1), forming a C-ring shape in a vehicle side view.

Specifically, a tip portion 62a of the locked portion 62 is spaced apart from the bonnet mounting portion 61 (protrusion portion 64) in the vehicle lower side, and between the locked portion 62 and the bonnet mounting portion 61 which are spaced apart from each other, an internal space 62s is formed which is surrounded by the locked portion 62 and the bonnet mounting portion 61 in a vehicle side view.

At the front side of this internal space 62s, an open portion 65 open toward the front side is formed. Although the internal space 62s of the locked portion 62 and the open portion 65 are both formed so that the locking portion 52b can be inserted therethrough, the open portion 65 is formed so as to have a smaller width in the vehicle up-down direction than the internal space 62s.

Next, as shown in FIGS. 3 and 4, at a front portion of the lid 30 and a vehicle-width-direction center portion thereof, a band mounting portion 37 is provided. A base end (other end portion) of the band 41 of the locking means 40 in the length direction is mounted on this band mounting portion 37. As shown in FIG. 2, in a front view, a mounting position of this band 41 is a position corresponding to a mounting position of the clip 60 on the bonnet 1 side.

As shown in FIGS. 3 and 4, this band mounting portion 37 at the lid 30 is provided on the inner face (bottom face) side of a front-side flange 38f of the lid 30 and at a rear portion thereof. The band mounting portion 37 includes a band axially supporting portion 37a extending in the vehicle width direction and, in a state where a ring-shaped portion 42 formed at the base end of the band 41 in the length direction is inserted through this band axially supporting portion 37a, axially and rotatably supports the base end of the band 41.

At the tip portion (one end portion) of the band 41 in the length direction, similarly to the base end, the ring-shaped portion 43 is formed. The band mounting frame portion 54 of the locking member 51 includes the axis portion 54a extending in the vehicle width direction and, in a state where the ring-shaped portion 43 formed at the tip portion of the band 41 in the length direction is inserted through this axis portion 54a, axially and rotatably supports the tip portion of the band 41. In other words, the locking member 51 is rotatably mounted on the tip portion of the band 41 in the length direction.

Furthermore, in a state where the locking portion 52b of the locking means 40 is locked to the locked portion 62 on the bonnet 1 side, as shown in FIGS. 3 and 4, the locking means 40 is arranged so as to pass through a tip (front end) of the front-side flange 38f of the lid 30 from the band mounting portion 37 provided on the inner face side of the lid 30 and be directed to the locked portion 62 from the tip position. Namely, the band 41 directed to the tip (front-side flange 38f) of the lid 30 from the band mounting portion 37 is redirected by using the tip of the lid 30 as a turning point 44. Then, the redirected band 41 is inclined in the direction directed to the locked portion 62, namely, the direction directed from the vehicle front lower side to the vehicle rear upper side, and extends in a linear shape together with the above-described locking member 51.

A distance from the band mounting portion 37 on the lid 30 side to the locked portion 62 on the bonnet 1 side via the turning point 44 of the tip of the lid 30 as described above substantially corresponds to a distance obtained by adding up the length of the band 41 and the length of the locking member 51 in the longitudinal direction, and, here, a distance from the turning point 44 of the band 41 located at the front end of the lid 30 to the locked portion 62 on the bonnet 1 side corresponds to a distance La (hereinafter referred to as the "bridge distance La") forming a bridge between both members 1 and 30 (see FIG. 4).

As shown in FIGS. 1 and 2, by locking the locking means 40 to the locked portion 62 on the bonnet 1 side supported by the bonnet stay 5, an upper end portion of the locking means 40 is brought into a state of being suspended by the bonnet 1 maintained in a posture inclined at the fully-open opening (fully-open state), and, at this time, the lid 30 connected to the locking means 40 is also held in a posture inclined at the fully-open opening (fully-open state), similarly to the bonnet 1.

Here, the fully-open opening of the bonnet 1 is set so as to satisfy an opening range satisfying both a head hit avoidance opening in which, for, for example, opening the bonnet 1 and looking into the engine room, a person inserting his or her head above the engine room from the front side does not hit the bonnet 1 on his or her head, and a hand reach opening in which a human hand reaches an upper end of the bonnet 1 in an open state from the vehicle front side.

Specifically, in the present embodiment, the fully-open opening of the bonnet 1 is set to about 47 degrees.

Similarly, in the fully-open opening of the lid 30, a cover opening is set so as to be an opening satisfying a range obtained in consideration of both head hit avoidance opening and hand reach opening and is, in the present embodiment, set to about 70 degrees.

Namely, when the locking means 40 is locked to the locked portion 62 of the bonnet 1 at the fully-open opening, the length of the band 41 of the locking means 40 is set to a length at which the bridge distance La is obtained in which the lid 30 has an opening satisfying both head hit avoidance opening and hand reach opening.

Furthermore, thus, when the bonnet 1 and the lid 30 both have the fully-open opening, the locked portion 62 has the configurations as described above (configurations such as the positional relationship and the direction), and thus, as shown in FIG. 4, the locking portion 52b is reliably locked to the locked portion 62 at, in the internal space 62s of the locked portion 62, a rear end position spaced apart rearward from the open portion 65, namely, a position on the base side of the locked portion 62 (see FIG. 4).

Meanwhile, the locking means 40 in the present embodiment is configured such that locking to the locked portion 62 on the bonnet 1 side is released in conjunction with the closing operation of the bonnet 1.

The bonnet 1 and the lid 30 are set in a positional relationship so that the bridge distance La between both members 1 and 30 between which the locking means 40 locked to the locked portion 62 forms a bridge (the shortest distance connecting the locked portion 62 and the turning point 44) becomes larger when the locking portion 52b is released from the locked portion 62 than when the locking portion 52b is locked to the locked portion 62. In other words, the bonnet 1 and the lid 30 are configured such that, when the closing operation is performed from the fully-open opening of the bonnet 1 (the locking portion 52b is locked to the locked portion 62), an interval between the turning point 44 of the band 41 and the locked portion 62 on the bonnet 1 side becomes gradually wider.

Namely, in the setting of such a positional relationship of both members 1 and 30 (such as the relative layout of the pivotally attached portions 4 and 36 of both members 1 and 30 and the rotational radius), when the closing operation of the bonnet 1 is started, as a predetermined opening at which the locking portion 52*b* is released from the locked portion 62 (hereinafter referred to as a "locking release opening") is approached, the displacement amount toward the front side (in the rotational displacement, the displacement component toward the vehicle front side/the displacement component toward the front side in the front-rear direction in which the bonnet 1 extends) becomes relatively larger at the position of the turning point 44 of the lid 30 (the tip of the flange 38*f*) than at the position of the locked portion 62 of the bonnet 1. Due to a difference in such a relative displacement amount, the bridge distance La becomes larger than a length of a portion joining the bonnet 1 and the lid 30 at the locking means 40 in a linear shape, namely, a distance connecting the locking portion 52*b* of the locking means 40 and the band mounting portion 37 on which the band 41 of the locking means 40 is mounted, in a linear shape (see FIG. 6). When the closing operation of the bonnet 1 is thus performed, the bridge distance La increases to a distance in which the locking portion 52*b* cannot be continuously locked by the locked portion 62.

In the present embodiment, as the bridge distance La thus increases, the lid 30 can cause a tension (specifically, a vehicle-forward-direction component of a tensile force) pulling the locking member 51 toward the vehicle front side with respect to the locked portion 62 (with respect to the bonnet 1, the direction of the tip side thereof) to act on the band 41 and is configured to use this tension and release locking of the locking portion 52*b* with respect to the locked portion 62 through the open portion 65.

Specifically, as indicated by a virtual line (two-dot chain line) in FIG. 5, when the bonnet 1 and the lid 30 both have the fully-open opening, as described above, the locking portion 52*b* is brought into a state of being engaged with the locked portion 62, namely, a rear end of the internal space 62*s* thereof (see FIG. 4).

Figure 6:
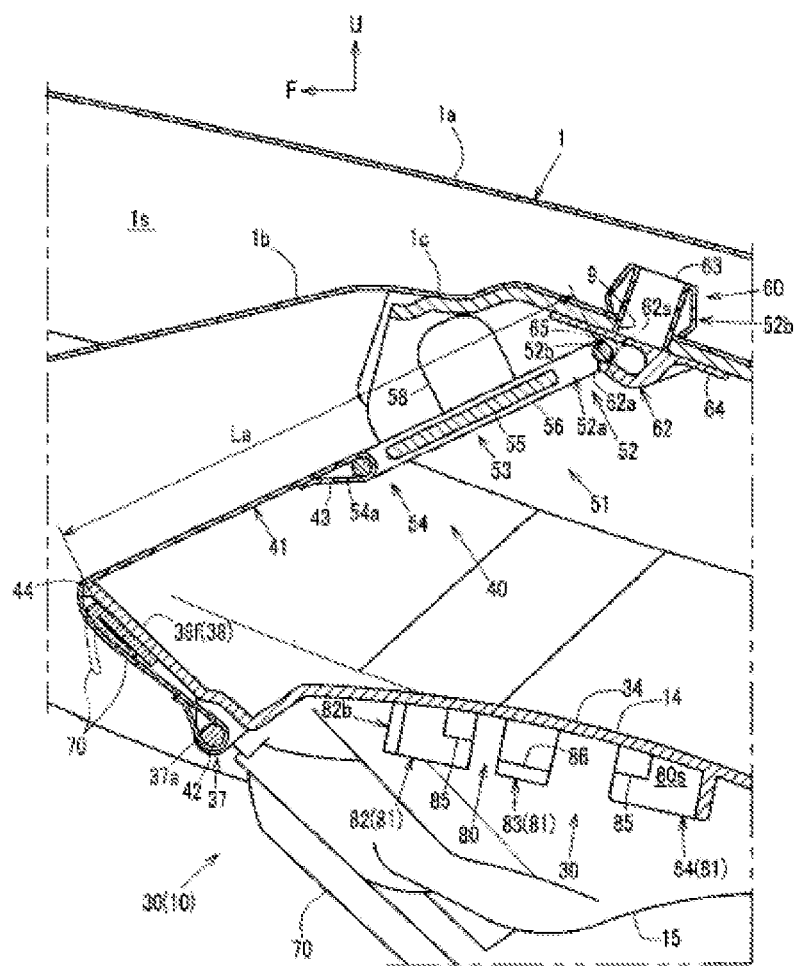
FIG. 6 is a view corresponding to FIG. 4 when the bonnet is in the locking release opening state.

In conjunction with the closing operation of the bonnet 1 from the state, the closing operation of the lid 30 is also performed via the locking means 40 (namely, the opening becomes smaller). At this time, the locking portion 52*b*, in a state of being engaged with the locked portion 62, slides to the front side (on the tip portion 62*a* side of the locked portion 62) along an inner edge (upper line) of the locked portion 62 from a rear end of the internal space 62*s* (see FIG. 6), and when the bonnet 1 reaches the locking release opening (indicated by a solid line in FIG. 5), the locking portion 52*b* is released from the locked portion 62 through the open portion 65 as shown in FIG. 6.

Here, the configuration in which the locking member 51 is released from the locked portion 62 when the bonnet 1 has the locking release opening uses, as described above, the positional relationship between the bonnet 1 and the lid 30, namely, at the time of the closing operations of the bonnet 1 and the lid 30, the relative deviation of the respective rotational displacements.

Specifically, based on, for example, a difference in the relative layout of the pivotally attached portions 4 and 36 of both members 1 and 30 and a difference in rotational radius (each of distances connecting the pivotally attached portions 4 and 36 and the locked portion 62), furthermore, the formation position and the like of the open portion 65 at the locked portion 62, the shape of the locked portion 62, and the bridge distance La (the length of the locking means 40 and the mounting position on the bonnet 1 of the locked portion 62), the configuration in which the locking member 51 is released from the locked portion 62 can be embodied.

The present embodiment is configured such that locking is released at or at around an intermediate opening which is about half the opening of the fully-open opening (for example, 47 degrees) at the time of the closing operation of the bonnet 1, and the locking release opening of the bonnet 1 is set to about 30 degrees. The locking release opening of the lid 30 at this time is set to about 40 to 45 degrees.

Next, the reasons for setting the locking release opening will be described in detail.

The lid 30, after the locking portion 52*b* is released from the locked portion 62 on the bonnet 1 side, falls due to the self-weight independently of the bonnet 1, and thereby the closing operation is performed. Thus, on the premise of the above-described positional relationship between the bonnet 1 and the lid 30 in the present embodiment, if the locking release opening of the bonnet 1 is set to a larger opening than around the intermediate opening, the displacement amount in which the lid 30 independently performs the closing operation (falls due to the self-weight) increases accordingly, and thus there is a concern that, when the lid 30 is fully closed as indicated by the one-dot chain line in FIG. 5, the shock applied from the cover body 20 increases.

Meanwhile, the user performs operations such as, from a state where the bonnet 1 is inclined at an opening before completely closed (for example, about 20 degrees), releasing his or her hand from the bonnet 1 which has been held until then to cause the bonnet 1 to fall due to the self-weight and lightly pressing the bonnet 1 until the bonnet 1 is fully closed. Thus, the bonnet 1 is often fully closed by, for example, using the shock of the self-weight fall of the bonnet 1 and causing the striker 6 to engage with the latch mechanism 7.

In such a situation, on the premise of the above-described positional relationship between the bonnet 1 and the lid 30, if the locking release opening of the bonnet 1 is set to a smaller opening than around the intermediate opening, the locking portion 52*b* is, without being released from the locked portion 62 on the bonnet 1 side when the user releases his or her hand from the bonnet 1, forced to be released from the locked portion 62 in the middle of the self-weight fall of the bonnet 1, and thus there is a concern that it is difficult for the lid 30 to stably release the locking portion 52*b* from the locked portion 62.

Accordingly, in the present embodiment, the locking release opening of the bonnet 1 is set to the above-described value (for example, about 30 degrees) so as to satisfy a range smaller than an upper limit opening at which the shock applied when the lid 30 falls due to the self-weight is acceptable and larger than an opening at which the user starts releasing the support of the bonnet 1 (bonnet support release opening) just before the bonnet 1 is fully closed.

Figure 7:
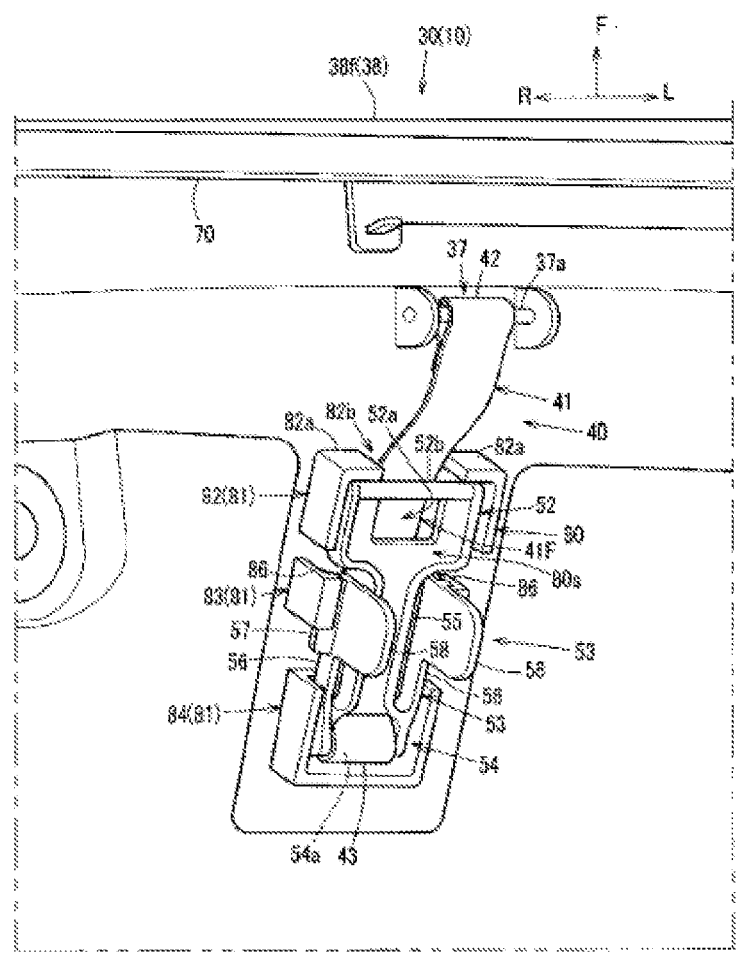
FIG. 7 is an enlarged view of the main portion when a main portion of the lid according to the embodiment of the present invention is viewed from the bottom face side thereof in a state where the locking means is stored in a storage.

Furthermore, as shown in FIG. 7, the locking means 40 is, when not in use, stored in the storage 80 provided at the inner face (bottom face) of the lid 30. Hereinafter, the storage 80 will be explained mainly with reference to FIGS. 3, 6, and 7 based on the posture when the lid 30 is closed.

The storage 80 is disposed at, in the front portion of the inner face of the lid 30, the rear position of the band mounting portion 37 and a vehicle-width-direction center position (see FIG. 2).

The locking means 40 can be stored so that the locking member 51 is removable from the storage 80 so that the pair of pinching pieces 58 projects downward and the locking portion 52*b* faces to the inner face of the lid 30 in a posture facing forward. The storage 80 includes a storage wall 81 in a raised wall shape which is provided to protrude downward from the inner face of the lid 30 in a front view of the locking member 51 as described above so as to surround an outer periphery of the locking member 51.

In the locking means 40, a tip-side portion (see FIG. 7) including the locking member 51 is stored by the storage wall 81 in a state of being fitted in a storage space 80s (see FIG. 6) formed on the inner side of the storage wall 81 in a front view.

The storage wall 81 is configured by being divided into, from the front side along the rear side, a front-side storage wall 82, an intermediate storage wall 83, and a rear-side storage wall 84 which store, in the longitudinal direction of the locking member 51, the locking frame portion 52, the grip portion 53, and the band mounting frame portion 54, respectively.

As shown in FIGS. 3 and 6, at each of left and right side walls provided at the front-side storage wall 82 and each of left and right side walls provided at the rear-side storage wall 84, locking member support bases 85 capable of supporting the locking member 51 in a state of being raised downward at a height corresponding to the thickness of the band 41 with respect to the inner face of the lid 30 are provided to protrude downward with respect to the inner face of the lid 30.

Each of the pairs of left and right locking member support bases 85 provided at the front-side storage wall 82 and the rear-side storage wall 84 respectively is provided to protrude so as to be spaced apart from each other at an interval corresponding to the width of the band 41.

Furthermore, as shown in FIG. 3, at a vehicle-width-direction center portion of a front wall 82a provided at the front-side storage wall 82, a recess 82b is formed which is recessed so as to have the same height as the inner face of the lid 30, and this recess 82b is also formed so as to have a width interval corresponding to the width of the band 41.

Thereby, as shown in FIG. 7, the storage 80 is configured such that, at a region on the upper side of the storage space 80s thereof in the up-down direction, a tip-side portion 41F of the band 41 which is incorporated into the storage space 80s from the front side of the storage 80 via the recess 82b can be disposed and, at a region on the lower side of the storage space 80s, with respect to the tip-side portion 41F of this band 41, the locking member 51 is folded by using the axis portion 54a as a fulcrum and can be disposed from the lower side. At this time, the tip-side portion 41F of the band 41 is disposed at a region between the pair of left and right locking member support bases 85 of the front-side storage wall 82 and between the pair of left and right locking member support bases 85 of the rear-side storage wall 84, and the locking member 51 is stored in a state of being supported by the locking member support bases 85.

Furthermore, as shown in FIGS. 3, 6, and 7, at lower ends of the pair of left and right intermediate storage walls 83 (tip portions in the projection direction toward the lower side), pressing pieces 86 are formed which project toward the vehicle-width-direction inner side and press the locking means 40 stored in the storage 80 from the lower side.

As shown in FIG. 7, this pressing piece 86 engages with the storage locking claw 57 of the locking member 51 (see FIGS. 3 and 7), and thereby the locking member 51 and the tip-side portion 41F of the band 41 which are stored in the storage space 80s so as to overlap with each other on each of the upper and lower sides can be held so as to be suppressed together from the lower side by the pressing piece 86.

When the locking means 40 is to be stored in the storage space 80s or taken from the storage state, the pair of left and right pinching pieces 58 is pinched, and the elastic rods 56 are bent and deformed toward the vehicle-width-direction inner side like a lever, thereby easily performing the disengagement.

As described above, in the vehicle front structure of the present embodiment, the thermal insulating cover 10 including the lid 30 that covers the upper side of the engine in an openable and closable manner is provided below the bonnet 1 that covers the upper side of the engine room in an openable and closable manner; the lid 30 is provided with, in the vehicle front-rear direction, the lid pivotally attached portion 36 (hinge fulcrum) on the same rear end side as the bonnet pivotally attached portion 4 as a hinge fulcrum of the bonnet 1 in the front-rear direction (see FIG. 1) and is openable and closable independently of the bonnet 1 (see FIGS. 1 and 2); and the lid 30 includes the locking means 40 that is locked to the bonnet 1 when the lid 30 is open (see FIGS. 1 to 4) and is released from the locking in conjunction with the closing operation of the bonnet 1 (see FIG. 6).

According to such a configuration, the lid 30 is locked to the bonnet 1 in an open state by the locking means 40, and thereby the lid 30 can also be held in an open state. Then, even in a case where the locking means 40 (locking portion 52b) is released from the bonnet 1 side (locked portion 62) prior to the closing operation of the bonnet 1, and thereafter the closing operation of the lid 30 is not appropriately performed due to, for example, inattention of the user (for example, omission of closing the lid 30), the lid 30 can be reliably closed by a rotational orbit independent of that of the bonnet 1. Namely, at the time of the closing operation of the bonnet 1, locking of the locking means 40 is released in conjunction with the closing operation of the bonnet 1, and thereby, while breakage of the lid 30 due to forcing of the closing operation of the lid 30 which is constrained by the rotational orbit at the time of the closing operation of the bonnet 1 is prevented, the lid 30 can be reliably closed.

The present embodiment is configured such that, from the fully-open state of the bonnet 1, locking of the locking means 40 is released at around the intermediate opening with respect to the opening in the fully-open state (see FIGS. 5 and 6).

According to such a configuration, at the time of the closing operation of the bonnet 1, after the bonnet 1 is inclined until the opening decreases to some extent or before the bonnet 1 is inclined at an opening just before the fully-closed state is reached (bonnet support release opening), locking of the locking means 40 is released, and thus a large load can be prevented from acting on the lid 30.

The present embodiment is configured such that the bonnet 1 and the lid 30 are in the positional relationship in which the bridge distance La between both members 1 and 30 between which the locking means 40 forms a bridge becomes larger when the locking means 40 is released from the bonnet 1 than when the locking means 40 is locked to the bonnet 1 and, as the bridge distance La increases, the locking member 51 is pulled forward by the lid 30, and thereby the locking with respect to the bonnet 1 is released (see FIG. 6).

According to such a configuration, the bridge distance La between both members 1 and 30 between which the locking means 40 forms a bridge becomes larger when the locking means 40 is released from the bonnet 1 than when the locking means 40 is locked to the bonnet 1, and, in association with this, by using the fact that the locking member 51 is pulled forward by the thermal insulating cover 10, the locking means 40 can be automatically released from the locking with respect to the bonnet 1 at the time of closing the bonnet 1.

In the present embodiment, the locking means 40 is formed by the locking member 51 that locks to the locked portion 62 provided on the bonnet 1 side, and the band 41 (extending member) having flexibility, including the locking member 51 at the tip thereof, having at least the bridge distance La when the length thereof is added up with that of the locking member 51 in the longitudinal direction, and extending from the lid 30 (see FIGS. 3, 4, and 6), and the open portion 65 open on the front side is formed at the locked portion 62 (see FIGS. 4 and 6).

Furthermore, in the present embodiment, the lid 30, in conjunction with the closing operation of the bonnet 1, due to the self-weight of the lid 30, performs the closing operation in which the lid 30 rotates around the lid hinge fulcrum 36 from an open state in which the locking means (locking mechanism) 40 of the lid 30 is locked to the locked portion 62 of the bonnet 1, and the bonnet 1 and the lid 30 are configured such that, as the closing operations thereof proceed, the locking means 40 connecting the locked member of the bonnet 1 and the tip portion of the lid 30 and extending in a linear shape including the bridge distance La is displaced so as to be inclined toward the vehicle front-rear direction (horizontal direction) (see FIGS. 4 and 6) and is pulled in the direction of the tip side of the bonnet 1 (the direction opposite to the rear end side provided with the bonnet hinge fulcrum 4/the direction of the tip side provided with the striker 6) by the closing operation due to the self-weight of the lid 30, and thereby releasing the locking member 52b of the locking means 40 through the open portion 65 formed at the locked portion (locked member) 62 of the bonnet 1.

According to the configurations as described above, by the simple structure of using the relative positional change of the locking portion 52b with respect to the open portion 65 of the locked portion 62, holding of the lid 30 can be automatically released.

The present invention is not limited to only the configurations of the above-described embodiment and can be formed in various embodiments.

REFERENCE SIGNS LIST

1 bonnet
10 thermal insulating cover
4 bonnet pivotally attached portion (hinge fulcrum of bonnet)
30 lid
36 lid pivotally attached portion (hinge fulcrum of thermal insulating cover)
40 locking means
41 band (extending member)
51 locking member
62 locked portion
65 open portion
La bridge distance

The invention claimed is:

1. A vehicle front structure characterized by comprising:
an engine room in which an engine is disposed;
a bonnet covering an upper side of the engine room in an openable and closable manner;
a bonnet hinge fulcrum provided at a predetermined end portion of the bonnet and rotatably supporting the bonnet;
a thermal insulating cover, on a lower side of the bonnet, comprising a lid covering an upper side of the engine in an openable and closable manner in the engine room;
a lid hinge fulcrum provided at a predetermined end portion of the lid of the thermal insulating cover;
a locked member provided at the bonnet to lock the lid of the thermal insulating cover; and
a locking mechanism provided at the lid of the thermal insulating cover to, when the lid is open, lock the lid to the locked member of the bonnet in an open state,
wherein the lid hinge fulcrum is, in a vehicle front-rear direction, provided at the predetermined end portion of the lid of the thermal insulating cover on the same side as the predetermined end portion of the bonnet at which the bonnet hinge fulcrum is provided,
the lid of the thermal insulating cover is openable and closable independently of the bonnet when the locking mechanism of the lid is not locked to the locked member of the bonnet, and
the locked member of the bonnet and the locking mechanism of the lid are configured such that, from open states of the bonnet and the lid in which the locking mechanism of the lid is locked to the locked member of the bonnet, when a closing operation of the bonnet in which the bonnet rotates around the bonnet hinge fulcrum is performed, in conjunction with the closing operation, locking of the locking mechanism of the lid to the locked member of the bonnet is released.

2. The vehicle front structure according to claim 1, wherein the locked member of the bonnet and the locking mechanism of the lid are configured such that, in conjunction with the closing operation of the bonnet, locking of the locking mechanism of the lid to the locked member of the bonnet is released at around an intermediate opening in an opening of the bonnet from a fully-open state to a fully-closed state.

3. The vehicle front structure according to claim 2, wherein the bonnet and the lid are in a positional relationship in which a bridge distance between the lid and the bonnet between which the locking mechanism of the lid locked to the locked member of the bonnet forms a bridge becomes larger when the locking mechanism of the lid is released from the locked member of the bonnet than when the locking mechanism of the lid is locked to the locked member of the bonnet, and
the locked member of the bonnet and the locking mechanism of the lid are configured such that, during the closing operation of the bonnet, the lid performs a closing operation by using the lid hinge fulcrum as a fulcrum, increasing the bridge distance, and the locking mechanism of the lid is thereby pulled in a direction of a tip side of the bonnet, releasing locking of the locking mechanism of the lid to the locked member of the bonnet.

4. The vehicle front structure according to claim 3, wherein the locking mechanism provided at the lid comprises:
a locking member having a predetermined length to lock to the locked member of the bonnet; and
an extending member having flexibility, extending from at least a tip portion of the lid, and having another end mounted on the locking member,
a total of lengths of the locking member and the extending member is a length corresponding to at least the bridge distance, and
an open portion open in the direction of the tip side of the bonnet is formed at the locked member of the bonnet.

5. The vehicle front structure according to claim 4, wherein the locking member of the locking mechanism comprises a locking portion configured to lock to the locked member of the bonnet, and a space portion configured to lock the locking portion of the locking member is formed at the locked member of the bonnet.

6. The vehicle front structure according to claim 4, wherein the lid, in conjunction with the closing operation of the bonnet, due to a self-weight of the lid, performs a closing operation in which the lid rotates around the lid hinge fulcrum from the open state in which the locking mechanism of the lid is locked to the locked member of the bonnet, and the bonnet and the lid are configured such that, as the closing operations of the bonnet and the lid proceed, the locking mechanism of the lid, the locking mechanism connecting the locked member of the bonnet and the tip portion of the lid and extending in a linear shape including the bridge distance, is displaced so as to be inclined toward the vehicle front-rear direction and is pulled in the direction of the tip side of the bonnet by the closing operation due to the self-weight of the lid, thereby releasing the locking member of the locking mechanism through the open portion formed at the locked member of the bonnet.

7. The vehicle front structure according to claim 1, wherein a predetermined end portion of the bonnet hinge fulcrum is a rear end portion of the bonnet, a predetermined end portion of the lid hinge fulcrum is a rear end portion of the lid, and in a vehicle side view, the lid hinge fulcrum is provided at a position shifted toward a vehicle front side with respect to the bonnet hinge fulcrum.

8. The vehicle front structure according to claim 1, wherein the bonnet and the lid are in a positional relationship in which a bridge distance between the lid and the bonnet between which the locking mechanism of the lid locked to the locked member of the bonnet forms a bridge becomes larger when the locking mechanism of the lid is released from the locked member of the bonnet than when the locking mechanism of the lid is locked to the locked member of the bonnet, and the locked member of the bonnet and the locking mechanism of the lid are configured such that, during the closing operation of the bonnet, the lid performs a closing operation by using the lid hinge fulcrum as a fulcrum, increasing the bridge distance, and the locking mechanism of the lid is thereby pulled in a direction of a tip side of the bonnet, releasing locking of the locking mechanism of the lid to the locked member of the bonnet.

9. The vehicle front structure according to claim 8, wherein the locking mechanism provided at the lid comprises:

a locking member having a predetermined length to lock to the locked member of the bonnet; and an extending member having flexibility, extending from at least a tip portion of the lid, and having another end mounted on the locking member, a total of lengths of the locking member and the extending member is a length corresponding to at least the bridge distance, and an open portion open in the direction of the tip side of the bonnet is formed at the locked member of the bonnet.

10. The vehicle front structure according to claim 9, wherein the locking member of the locking mechanism comprises a locking portion configured to lock to the locked member of the bonnet, and a space portion configured to lock the locking portion of the locking member is formed at the locked member of the bonnet.

11. The vehicle front structure according to claim 9, wherein the lid, in conjunction with the closing operation of the bonnet, due to a self-weight of the lid, performs a closing operation in which the lid rotates around the lid hinge fulcrum from the open state in which the locking mechanism of the lid is locked to the locked member of the bonnet, and the bonnet and the lid are configured such that, as the closing operations of the bonnet and the lid proceed, the locking mechanism of the lid, the locking mechanism connecting the locked member of the bonnet and the tip portion of the lid and extending in a linear shape including the bridge distance, is displaced so as to be inclined toward the vehicle front-rear direction and is pulled in the direction of the tip side of the bonnet by the closing operation due to the self-weight of the lid, thereby releasing the locking member of the locking mechanism through the open portion formed at the locked member of the bonnet.

* * * * *